United States Patent
Simonin et al.

(10) Patent No.: US 6,714,783 B1
(45) Date of Patent: Mar. 30, 2004

(54) METHOD FOR AN AUTOMATIC SEARCH BY AN AIRCRAFT OF A COMMUNICATION ADDRESS OF A GROUND ENTITY IN AN ATN NETWORK

(75) Inventors: Alexandre Simonin, Charenton (FR); Nicolas Rossi, Sevres (FR)

(73) Assignee: Thomson-CSF Sextant, Velizy Villacoublay (FR)

( * ) Notice: Subject to any disclaimer, the term of this patent is extended or adjusted under 35 U.S.C. 154(b) by 0 days.

(21) Appl. No.: 09/774,175

(22) PCT Filed: May 19, 2000

(86) PCT No.: PCT/FR00/01376

§ 371 (c)(1),
(2), (4) Date: Feb. 1, 2001

(87) PCT Pub. No.: WO00/74270

PCT Pub. Date: Dec. 7, 2000

(30) Foreign Application Priority Data

Jun. 1, 1999 (FR) .......................................... 99 06879

(51) Int. Cl.⁷ ................................................ H04Q 7/20
(52) U.S. Cl. ........................ 455/431; 455/445; 370/328
(58) Field of Search ............................... 455/427, 428, 455/431, 445; 370/328, 331, 332, 333

(56) References Cited

U.S. PATENT DOCUMENTS

| | | | |
|---|---|---|---|
| 5,459,469 A | * 10/1995 | Schuchman et al. | .......... 342/37 |
| 5,539,922 A | 7/1996 | Wang | |
| 6,173,230 B1 | * 1/2001 | Camus et al. | ............... 701/120 |
| 2002/0155833 A1 | * 10/2002 | Borel | .......................... 455/431 |

OTHER PUBLICATIONS

T.L. Signore, 17th Dasc. AIAA/IEEE/SAE. Digital Avionics Systems Conference. Proceedings (CAT. No. 98 CH36267), 17th Dasc. AIAA/IEEE/SAE Digital Avionics Systems Conference. Proceedings, vol. 2, pp. F15/1–F15/5, "A Simplified Aeronautical Telecommunication Network (ATN) Avionics Architecture", Oct. 31–Nov. 7, 1998.

Sheila K. Gallegos, et al., AIAA/IEEE Digital Avionics Systems Conference. 12th Dasc (CAT. No. 93CH3327–4), Proceedings of 1993 IEEE.AIAA 12th Digital Avionics Systems Conference, pp. 98–103, "Innovative Approaches for Implementing the Aeronautical Telecommunication Network", Oct. 25–28, 1993.

T.L. Signore, et al., IEEE Military Communications Conference. Proceedings. Milcom 98 (CAT. No. 98CH36201), IEEE Military Communications Conference. Proceedings. Milcom 98, vol. 1, pp. 40–44, "The Aeronautical Telecommunications Network (ATN)", Oct. 18–21, 1998.

* cited by examiner

*Primary Examiner*—Lee Nguyen
*Assistant Examiner*—Un C Cho
(74) *Attorney, Agent, or Firm*—Oblon, Spivak, McClelland, Maier & Neustadt, P.C.

(57) ABSTRACT

A process for the automatic searching by an aircraft for a communication address of a ground entity of an ATN network. In the process, each address is coded according to a hierarchical binary tree structure including several fields. A first field identifies the network and the subsequent fields identify entities of the network. The process determines in the aircraft the address of the communication center to be contacted from the identity of an ground router which it receives, by comparing the received address of the router with those of the addresses contained in a database of the aircraft, and retaining as an address that which has the largest number of characters in common with the address of the ground router, given the tree structure of the addresses. Such a process may find particular application to ATN communications.

7 Claims, 2 Drawing Sheets

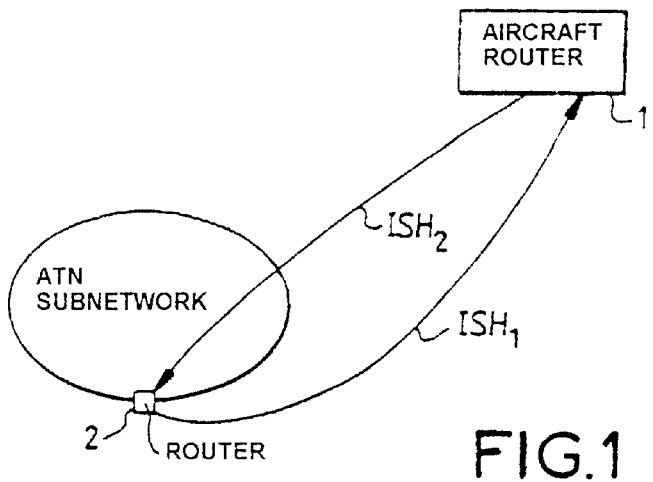
FIG.1
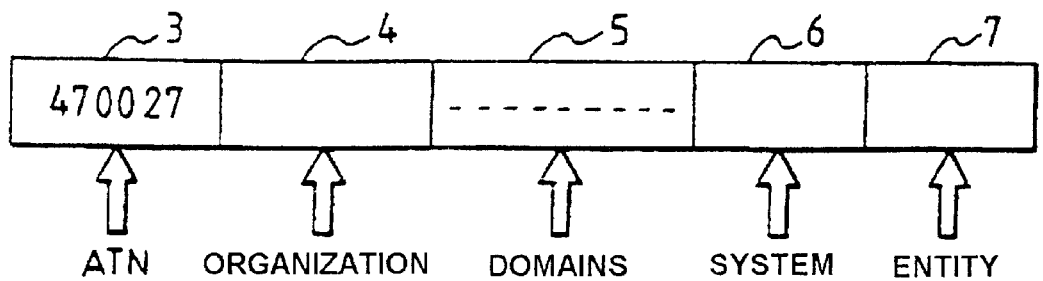
FIG.2
| NSAP PREFIX | CMA CENTER (LOCATION, PSAP) |
|---|---|
| 4700 27 | CMA ≠ 1 |
| 4700 27 81 47 | CMA ≠ 2 |
| 4700 27 81 22 34 89 | CMA ≠ 3 |
| 4700 27 81 35 | CMA ≠ 4 |
| 4700 27 81 07 | CMA ≠ 5 |
| 4700 27 81 07 1B | |
FIG.3

METHOD FOR AN AUTOMATIC SEARCH BY AN AIRCRAFT OF A COMMUNICATION ADDRESS OF A GROUND ENTITY IN AN ATN NETWORK

BACKGROUND OF THE INVENTION

1. Field of the Invention
2. Discussion of the Background

In an ATN architecture, an air/ground exchange is required on the initiative of the aircraft, to allow the application software to communicate. This exchange is manifested as an exchange of requests designated by the names "CM-Logon.request" for a query in the air/ground direction and "CM-Logon.confim" for a query in the ground/air direction, CM-Logon being the abbreviation for the expression "Context Management".

The "CM-Logon.request" request allows an airborne system to indicate to the ground those applications which are supported, and especially to which addresses the latter may be appended. This procedure enables ground application software to be apprised of the software of the airborne applications. On receipt of this request, a ground station stores the information relating to the accessibility of the applications of the aeroplane in a database.

Conversely, the "CM-Logon.response" request makes it possible:

a) for a ground system to indicate to an aircraft that it has received its request properly;

b) to indicate in return a list of applications available on the ground, as well as their addresses. As before, on receipt of the response, the aircraft stores the accessibility information for the software of the ground applications in a database.

This procedure is managed by a piece of application software known by the abbreviation CMA standing for the expression "Context Management Application" set up within ground entities and within a counterpart entity on board the aircraft. The CMA application software makes it possible to disseminate information relating to other applications of the type of those known by the abbreviations ADS, CPDLC, FIS, NMa, AOC, etc., and whose functionalities are described in the appendix. Thus, for example, before a CMA procedure is carried out successfully, the CPDLC entities which manage digital communications between air controller and pilot cannot communicate, although this becomes possible afterwards.

However, the problem remains unresolved for the CMA of the aircraft which initiates the procedure which is not a priori apprised of the ground address to which its request should be sent.

In the current systems, there is provision to involve the pilot such that the address of the ground CMA to be contacted is entered explicitly into the database of the CMA of the aircraft.

SUMMARY OF THE INVENTION

The object of the invention is to render this procedure automatic so as to absolve the pilot of any involvement.

Accordingly, the subject of the invention is a process for the automatic searching by an aircraft for a communication address of a ground entity to be contacted of an ATN network, each address being coded according to a hierarchical binary tree structure comprising several fields, a first field for identifying the network and the subsequent fields for identifying entities of the network of the type consisting:

in storing in a database of the aircraft the identities the addresses of a specified number of ground communication centers of an ATN network, in the aircraft transmitting the identity of the aircraft as known by its address to ground routers of an overflown ATN network, in the ground router which was able to be apprised of the identity of the aircraft transmitting its own address, characterized in that it consists in determining in the aircraft the address of the communication center (CMA) to be contacted from the identity of the router which it receives by comparing the received address of the router with those of the addresses contained in the database, retaining as address that which, given the hierarchical tree structure of the addresses, has the largest number of characters in common with the address of the ground router.

The main advantage of the process according to the invention is that it makes it possible to absolve the pilot of the need to input the initial CMA address. In view of its simplicity, it is fairly inexpensive to implement.

By utilizing the hierarchical structure of the NSAP address fields of the ATN networks, the process also allows custom-sizing of the database of the CMA centers. This sizing can be done according to one or a combination of the following criteria:

Capacity of the host structure accommodating this database: the larger the capacities, the more entries one may have.

Type of aircraft: medium-haul aircraft for example could have much slimmer bases than long-haul aircraft. The slimming being achieved as a function of the geographical zone covered by the scheduled flights of the aircraft (e.g. an aircraft dedicated to European traffic need not be apprised of the CMA centers of the Asian zone). Moreover, the format of the entries of the base of CMA centers being very simple, it can readily be stored in a space allowing easy updating. It may very readily be imagined that in the first instance updates may be accomplished by a technician. Further into the future, updating could be accomplished via the ATN network itself (i.e. with no physical intervention on the aircraft).

It may thus be noted that it is not absolutely necessary to have strictly the same information in all the bases carried on board the aircraft. This could enable the ATN network administrators to share out the aircraft over a finite number of centers (for example European aircraft essentially over European centers and then, to a lesser extent, over American and/or Asiatic centers and conversely for the other aircraft; or else military aircraft over certain centers, civil aircraft over others, etc.).

BRIEF DESCRIPTION OF THE DRAWINGS

Other characteristics and advantages of the process according to the invention will become apparent from the following description given in conjunction with the appended drawings which represent:

FIG. 1 the procedure implemented according to the invention for recognition of the identity of a ground router by an aircraft overflying its radio communication space.

FIG. 2 an exemplary hierarchical construction of the addresses used in an ATN network to perform the routing of the information through the network.

FIG. 3 an exemplary construction of a database serving in the identification of the various communication centers liable to be contacted by an aircraft during its flight.

DESCRIPTION OF THE PREFERRED EMBODIMENTS

Figure 4:
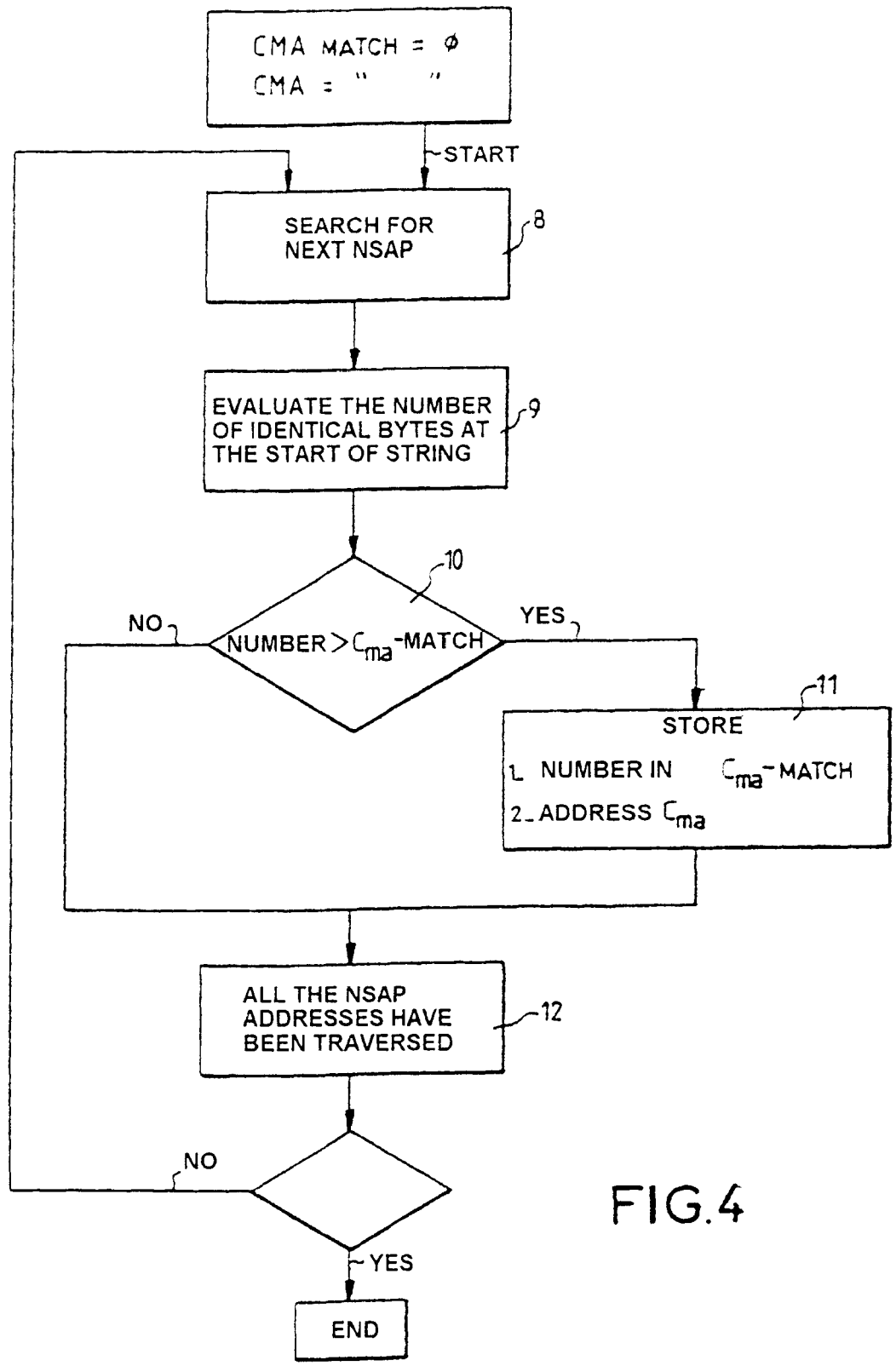
FIG. 4 an exemplary implementation of the process for the automatic determination of a communication address according to the invention in the form of a flowchart.

According to the invention the recognition by an aircraft of the identity of an ATN router takes place according to the information exchange mechanism represented diagrammatically in FIG. 1.

This borrows the known mechanism for the mutual recognition by two routers of an ATN network, entering into communication with one another, of their identity. According to this mechanism, upon detection of availability of an ATN subnetwork, an ATN router automatically triggers procedures for signaling, to the network, its identity by emitting an ISH signal, the abbreviation standing for "Intermediate SYSTEM Hello" which conveys the NSAP address of the emitter of the message, NSAP being the abbreviation standing for "Network Services Access Point". The router which is situated at the other end of the subnetwork and which receives this message is responsible for responding thereto by itself generating an ISH signal. At the termination of this procedure, each router is apprised of the identity of the other. In the case represented in FIG. 1 the router of the aircraft 1 identifies the router 2 of the ATN network which responds to it through an exchange of signals ISH1 and ISH2 between the two routers according to this same mechanism.

When the phase of recognition of the identities is completed a phase of searching for the address of a ground communication center is executed using the known characteristics of the addressing plan of an ATN network. This plan relies on a hierarchical tree construction of the addresses. Conventionally an address is coded in the manner represented in FIG. 2 in the form of a binary word comprising several fields. The first few bytes of the first field 3 identify the ATN network as a whole, the following field 4 identifies the organization which manages the addresses, the last few fields 5, 6 and 7 identify in particular: a routing domain, for example, an airline, the system, the entity within the system (in the case of several computers connected by a local area network, on the ground and on board) etc.

Thus, the straightforward analysis of the various fields of an address of a system, makes it possible to identify the entities or authorities responsible therefor and possibly their location within the topology of an ATN network.

The process uses a database which allows it to determine the identity and the CMA address of a center to be contacted as a function of the identity of the ground router with which the connection from the aircraft to the network is established.

It should be noted that according to this process, several remote CMA entities can be identified, since several NSAP addresses of neighboring routers, also designated under the abbreviation BIS, may be signaled by a stack of address registers of a database, the stack being able to signal up to one NSAP address per subnetwork supported. Each address is then recorded in the ATN communication stack thus formed, but it remains the job of the CMA application software to determine which of the centers should actually be contacted, for example, just one among N centers signaled, or all the centers signaled, etc.

As shown by the table of FIG. 3, the NSAP prefixes are stored in the database, each of these being associated with a CMA/ground center which is signaled by its identity made up of a "ground facility designator" word and of a PSAP transport address word. The process searches the database for the entry whose NSAP prefix has the largest number of characters in common with the start of the NSAP address word received from the neighboring BIS. As indicated by the table of FIG. 3, as soon as an entry exists in the database for the root of the NSAP addresses associated with the ground router (here 47 00 27 in FIG. 3), there is always a corresponding CMA center).

As shown clearly by the table of FIG. 3, the address of the CMA communication center retained in the database is that which exhibits, in common with the HSAP address of the ground router, the longest header. This amounts to retaining the address of the communication center having the largest number of characters in common with the address of the ground router, given the hierarchical tree structure which unfurls in an address from left to right as is apparent from FIG. 2.

On receipt of the NSAP "47 00 27 81 22 34 89 09 1B 24" the process identifies the center CMA#3.

On receipt of the NSAP "47 00 27 81 22 34 11 09 1B 24" the process identifies the center CMA#1.

On receipt of the NSAP "47 00 27 81 07 1A 11 09 1B 24" the process identifies the center CMA#5.

Owing to the fact that the addressing plan is hierarchical and that the network thus proceeds by delegation the process always finds the address of a CMA center which in the worst case will be that of a default CMA center.

It should be noted that the contents of the database can be different from one aircraft to another, this possibly being the case in particular between short-haul and long-haul aircraft or for the aircraft of different airlines which may have different CMA centers so as to ease the management of their routing.

The process for searching for a CMA address can be executed according to steps 8 to 12 of the flowchart of FIG. 4. It begins in step 8 with a reading of the first address at the head of the stack of addresses contained in the database, in evaluating in step 9 the number of consecutive bytes which are identical between the address read and the NSAP address transmitted by the ground router, so as to store this number in step 11 as well as the address of the corresponding CMA center. The process then returns to the execution of steps 8 and 9 to evaluate the number of bytes which are identical between the second address of the stack of addresses and the NSAP address of the ground router and to compare in step 10 the number obtained with the number previously stored so as to replace it in step 11 by the new number obtained in step 9 or in the contrary case to return to the execution of steps 8 and 9 to read and compare with the NSAP address of the ground router the third address of the stack. The process continues thus for as long as in step 12 it has not been observed that all the addresses of the stack have been traversed. When such is the case the CMA address which is retained is then the last one which was stored in the course of the execution of step 11.

The implementation of this processing can take place with the aid of a processing unit (not represented), programmed for this purpose, and coupled to a mass memory for recording the database.

Ads the abbreviation standing for "Automatic Dependance Surveillance" denotes a piece of on-board software which can be used to respond to requests for information regarding for example the geographical position of the aircraft, or meteorological conditions, etc. issued from the ground, CPDLC, the abbreviation standing for "Control Pilot Data Link Communication" denotes a piece of software which administers the communication exchanges in digital form between the pilot of the aircraft and a ground controller, FIS, the abbreviation standing for "Flight Information Service" denotes a piece of software located in a ground entity, similar to the on-board ADS used to respond to requests from aircraft of the type relating to the approach routes, or the ground temperature for example, Nma, the abbreviation standing for "Network Management Agent" denotes a piece of software used by the administrator of an ATN network making it possible to collect information about the general operation of the routers of the network whether they be on the ground or on-board, AOC, the abbreviation standing for "Aeronautical Operational Communication" denotes a piece of software which groups together applications which can be used by airlines such as for example that consisting in itemizing the timetables of pilots in respect of their forthcoming flights, NSAP, the abbreviation standing for "Network Service Access Point" denotes address fields allowing the addressing of entities in an ATN network, BIS, the abbreviation standing for "boundary Intermediate System" is used to designate an ATN router, PSAP, the abbreviation standing for "Presentation Service Access Point" is an application address field.

What is claimed is:

1. Process for the automatic searching by an aircraft for a communication address of a ground entity to be contacted of an ATN network, each address being coded according to a hierarchical binary tree structure comprising several fields, a first field for identifying the network and the subsequent fields for identifying entities of the network of the type consisting:

in storing in a database of the aircraft the identities the addresses of a specified number of ground communication centers of an ATN network, in the aircraft transmitting the identity of the aircraft as known by its address to ground routers of an overflown ATN network, in the ground router which was able to be apprised of the identity of the aircraft transmitting its own address, characterized in that it consists in determining in the aircraft the address of the communication center to be contacted from the identity of the router which it receives by comparing the received address of the router with those of the addresses contained in the database, retaining as address that which has the largest number of characters in common with the address of the ground router, given the tree structure of the addresses.

2. Process according to claim 1, characterized in that it consists in modifying the addresses contained in the database as a function of the type of the aircraft and of its mission.

3. Process according to claim 2, characterized in that the addresses are compared in succession from the start address to the end address over the set of addresses contained in the database.

4. Process according to claim 2, characterized in that it consists in associating a communication center with each address.

5. Process according claim 1, characterized in that the addresses are compared in succession from the start address to the end address over the set of addresses contained in the database.

6. Process according to claim 5, characterized in that it consists in associating a communication center with each address.

7. Process according to claim 1, characterized in that it consists in associating a communication center with each address.

* * * * *